United States Patent [19]

Hill

[11] Patent Number: 4,621,864
[45] Date of Patent: Nov. 11, 1986

[54] TILTABLE ARM REST ASSEMBLY AND MOUNTING AND OPERATING MEANS THEREFOR

[75] Inventor: Kevin E. Hill, Milwaukee, Wis.

[73] Assignee: Milsco Manufacturing Company, Milwaukee, Wis.

[21] Appl. No.: 681,444

[22] Filed: Dec. 13, 1984

[51] Int. Cl.⁴ ............................................... A47C 7/54
[52] U.S. Cl. ................................... 297/115; 297/356; 297/411; 297/417
[58] Field of Search ............... 297/115, 356, 408, 411, 297/417; 16/323, 326, 334, 348, 349; 403/92, 93

[56] References Cited

U.S. PATENT DOCUMENTS

| | | | |
|---|---|---|---|
| 773,720 | 11/1904 | Drury | 297/356 X |
| 970,635 | 9/1910 | Matthes | 297/356 X |
| 4,073,538 | 2/1978 | Hunter | 297/417 |
| 4,307,913 | 12/1981 | Spiegelhoff | 297/115 X |
| 4,370,898 | 2/1983 | Maruyama | 403/93 X |

Primary Examiner—William E. Lyddane
Assistant Examiner—Peter R. Brown
Attorney, Agent, or Firm—James E. Nilles

[57] ABSTRACT

A tiltable operator's seat assembly for a backhoe has detachable independently tiltable arm rest assemblies pivotally mounted on opposite sides thereof. The seat assembly is tiltable between normal, mid-tilt and full-tilt positions. Each arm rest assembly is independently tiltable upwardly from a full-down (stored) tilt position, to normal-tilt, to mid-tilt or to high-tilt positions. An operating mechanism in the arm rest assembly enables it to be releasably locked in the selected tilt position. The arm rest assembly cannot be moved downwardly from one tilt position to a lower tilt position. Upward pivoting of the arm rest from the high-tilt position to a reset position operates the operating mechanism to effect unlocking and enable the arm rest assembly to be swung to full-down (stored) tilt position for storage or for repositioning. The arm rest assembly includes an arm rest plate and the operating mechanism includes a pivot shaft non-rotatably secured to the seat assembly and upon which the arm rest plate is pivotally mounted. A pawl is rigidly secured to the pivot shaft and a latch member is pivotally mounted on the arm rest plate and has teeth which are releasably engageable with the pawl. A connecting rod is pivotally connected between the pawl and latch member, and an overcenter spring is connected between the latch member and the arm rest plate. A biasing spring connected between the pawl and arm rest plate prevents accidental disengagement of the pawl and latch member and consequent loss of a selected tilt position in the event of severe road shock or the like.

2 Claims, 11 Drawing Figures

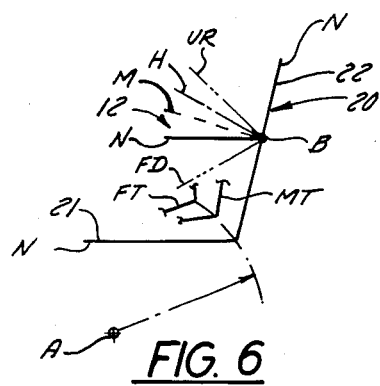
FIG. 6
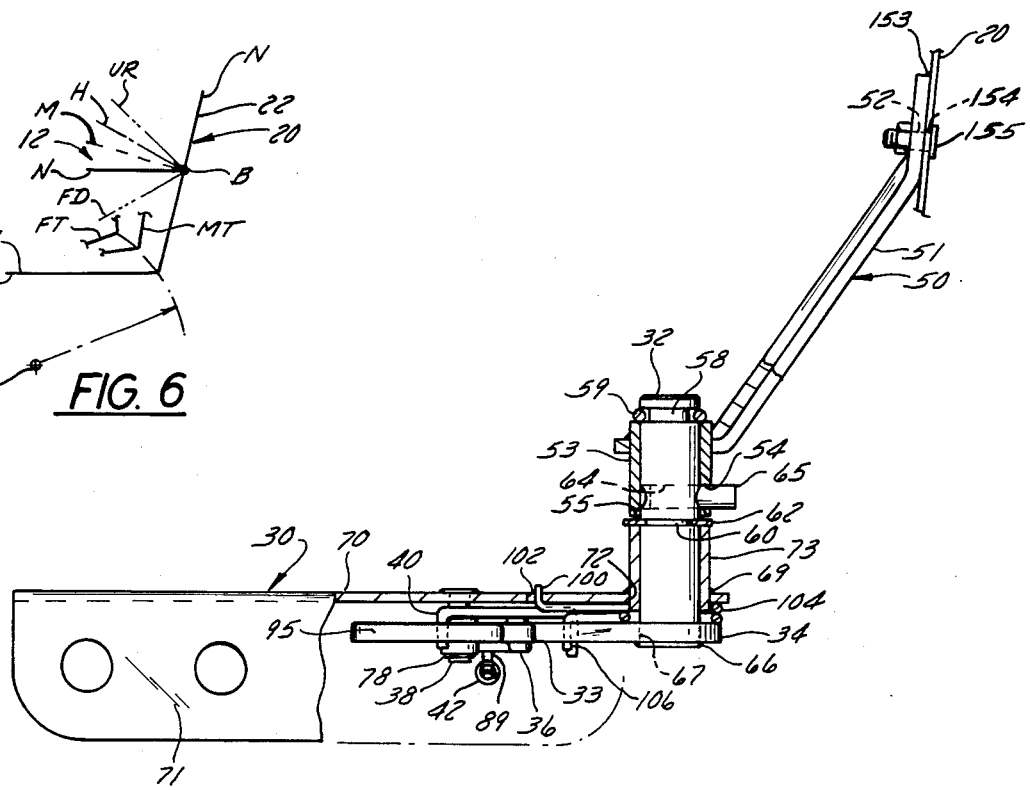
FIG. 4
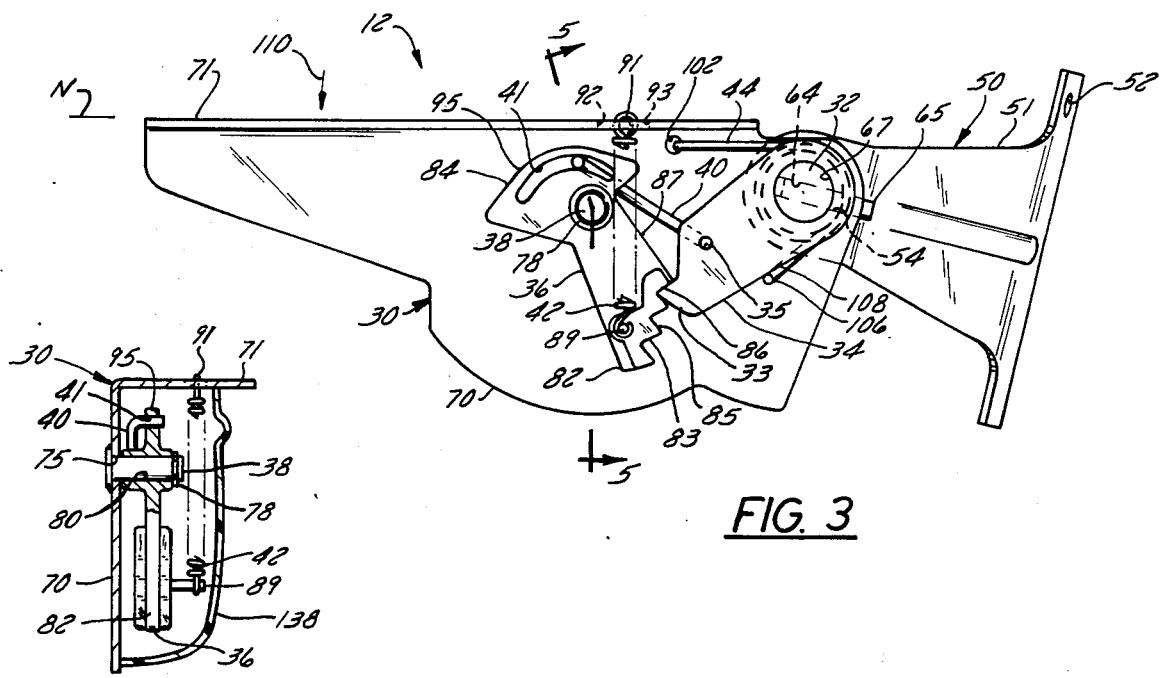
FIG. 5
FIG. 3

TILTABLE ARM REST ASSEMBLY AND MOUNTING AND OPERATING MEANS THEREFOR

BACKGROUND OF THE INVENTION

1. Field of Use

This invention relates generally to a tiltable arm rest assembly for use with a stationary or tiltable seat assembly and to mounting means and operating means therefor.

2. Description of the Prior Art

In some vehicles, such as construction machinery or the like, the operator's seat assembly typically comprises a generally horizontal seat portion and an upright back rest portion. The seat assembly can be adjusted in various ways to suit the comfort and convenience of the operator. For example, the entire seat assembly can be shifted fore and aft, rotated in opposite directions about a vertical axis, or raised and lowered. In some seat assemblies the back rest portion can be tilted forward and backward relative to the seat portion. In some machines, such as backhoes, it is desirable that either the entire seat assembly, or at least the seat portion thereof, be tiltable forwardly downwardly to various positions to enable the operator to better view the worksite. If the seat assembly is provided with arm rests, it is desirable that they also be tiltable when the seat assembly or seat portion is tilted so that the operator's arms are adequately supported. It is also convenient and comfortable for the operator if the arm rests can be tilted (or moved to an out-of-the way stored position), even if the seat assembly or the seat or back rest portions thereof cannot be tilted.

SUMMARY OF THE PRESENT INVENTION

The present invention provides an improved tiltable arm rest assembly and improved mounting means and improved operating means therefor. The tiltable arm rest assembly is usable with a stationary or tiltable seat assembly. The tiltable arm rest assembly is especially well-adapted for use with a vehicle seat assembly of a type in which either the entire seat assembly is tiltable or the seat assembly or back rest assembly or both are independently tiltable.

The improved mounting means and operating means of the arm rest assembly are also employable in types of apparatus other than arm rests and could be used, for example, in any component assembly which is mountable on a suitable support and includes a member which is pivotably movable on the support to several positions wherein it is to be locked.

The arm rest assembly can be mounted directly on some portion of the seat assembly (whether the latter is stationary or movable) or can be mounted on a suitable support structure adjacent the seat assembly. The improved mounting means enable the arm rest assembly to be permanently or detachably mounted alongside the seat assembly. Preferably, a pair of arm rest assemblies are employed; one on each lateral side of the seat assembly.

The arm rest assembly is disclosed herein as releasably mounted on a tiltable seat assembly and above the seat portion thereof.

The arm rest assembly is pivotally movable vertically thereon between angularly spaced apart full-down (stored) position, normal-tilt position, mid-tilt and high-tilt position and an upper reset position. The arm rest assembly comprises an arm rest in the form of a rigid metal member or pan, mounting means on the arm rest for mounting the arm rest assembly on the seat assembly for pivotal movement between the several positions, and operating means mounted on the arm rest member. The operating means are actuatable by pivotal movement of the arm rest upward from full-down (stored position) to any higher tilt position to releasably lock the arm rest in the selected tilt position and prevent downward movement thereof. The operating means are further actuatable by upward pivotal movement of the arm rest from the selected tilt position to the upper reset position to release the arm rest and enable downward pivotal movement thereof from the reset position, through the high-, mid-, and normal-tile positions, to full-down (stored) position.

In the aforesaid arm rest assembly the mounting means comprises a horizontally extending pivot shaft attachable to the seat assembly. The arm rest takes the form of a rigid metal member pan which is pivotally mounted on the pivot shaft and swingable in a substantially vertical plane. The operating means comprises a pawl rigidly mounted on the pivot shaft and extending downwardly therefrom; a latch pivotally mounted on the arm rest pan and swingable in a substantially vertical plane and releasably engageable with the pawl; an overcenter spring connected between the latch and the arm rest pan structure; and a connecting rod connected between the pawl and the latch. The overcenter extension spring operates to maintain engagement of the pawl and latch when the arm rest pan is moved from full-tilt to some higher tilt position. The connecting rod effects disengagement of the latch and the pawl and effects overcenter movement of the overcenter extension spring when the arm rest pan is moved from high-tilt position to the upper reset position. The connecting rod also swings the latch and effects opposite overcenter movement of the overcenter spring when the arm rest pan is moved to full-down (stored) position. Biasing means may be provided if necessary to prevent movement of the arm rest from one tilt position to a higher tilt position unless manual lifting force of predetermined magnitude is applied to move the arm rest upwardly to thereby prevent normal road shocks or jarring of the vehicle from displacing the arm rest from a selected tilt position.

An improved arm rest assembly and improved mounting means and improved operating means therefor offer several advantages over the prior art. For example, each arm rest assembly can be or installed and removed in the factory or field. Either or both arm rest assemblies can be used. They are independently adjustable to selected tilt positions. The full-down (stored) position is usable to compliment the seat asembly as a hip support means or merely for storage of the arm rest assembly or to make ingress and egress more convenient. The arm rest assembly is positively locked in selected tilt position and is not easily accidentally displaced therefrom. Repositioning of the arm rest assembly is accomplished by direct manual manipulation thereof and not by use of separate latches, levers or other adjustment devices. The operating means is simple, reliable, trouble free and is well-protected from adverse environmental conditions such as rain, dust or liquid splashing thereagainst.

Other objects and advantages of the invention will hereinafter appear.

DRAWINGS

FIG. 3 is a greatly enlarged side elevation view, with upholstery removed, of the outer side of the arm rest assembly of FIGS. 1 and 2 and showing the arm rest in normal-tilt position;

FIG. 4 is a top plan view of the arm rest assembly and support means shown in FIGS. 2 and 3;

FIG. 5 is a cross-section view taken on line 5—5 of FIG. 3;

FIG. 6 is a schematic diagram showing various tilt positions of the seat assembly and tilt positions of the arm rest assembly of FIG. 1;

Figure 1:
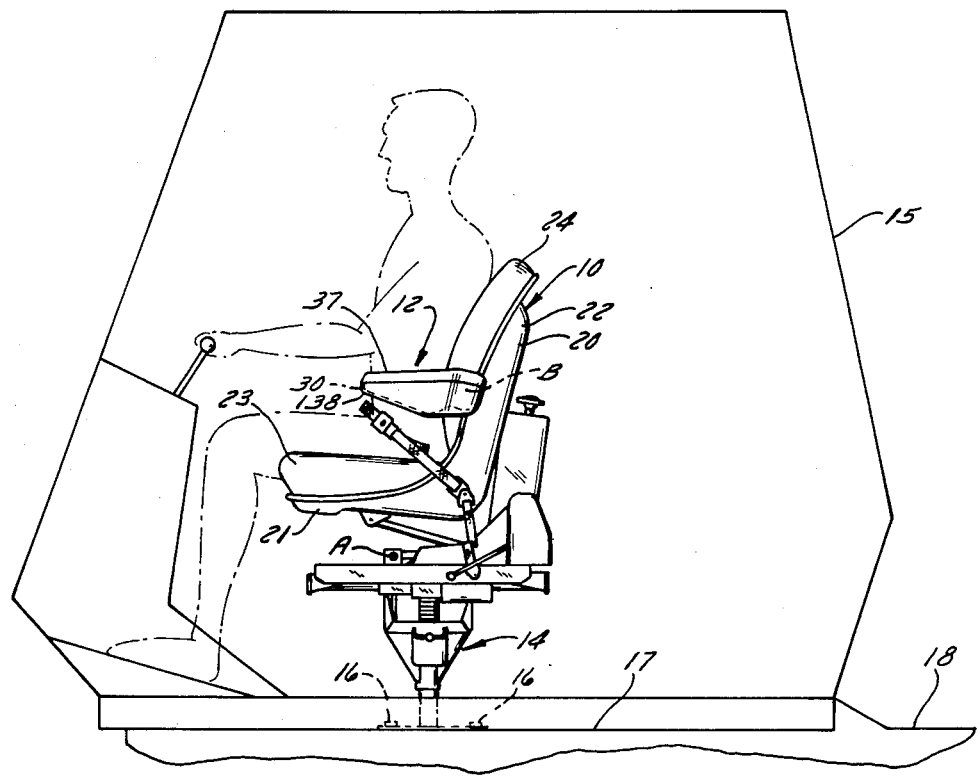
FIG. 1 is a side elevation view of a pedestal-mounted tiltable seat assembly employing a pair of tiltable arm rest assemblies (only one shown) in accordance with the present invention.
Figure 7:
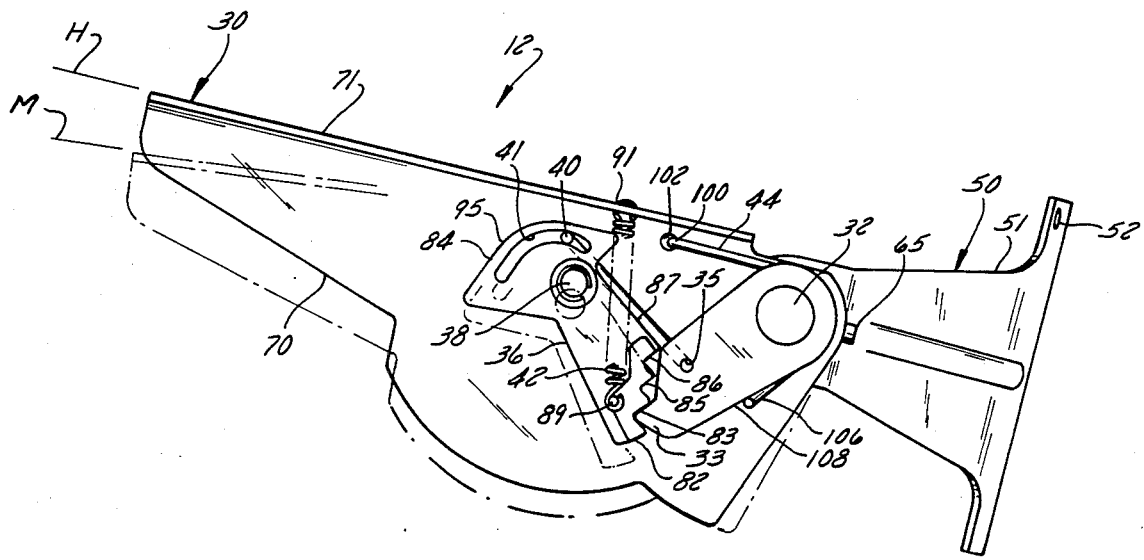
Figure 8:
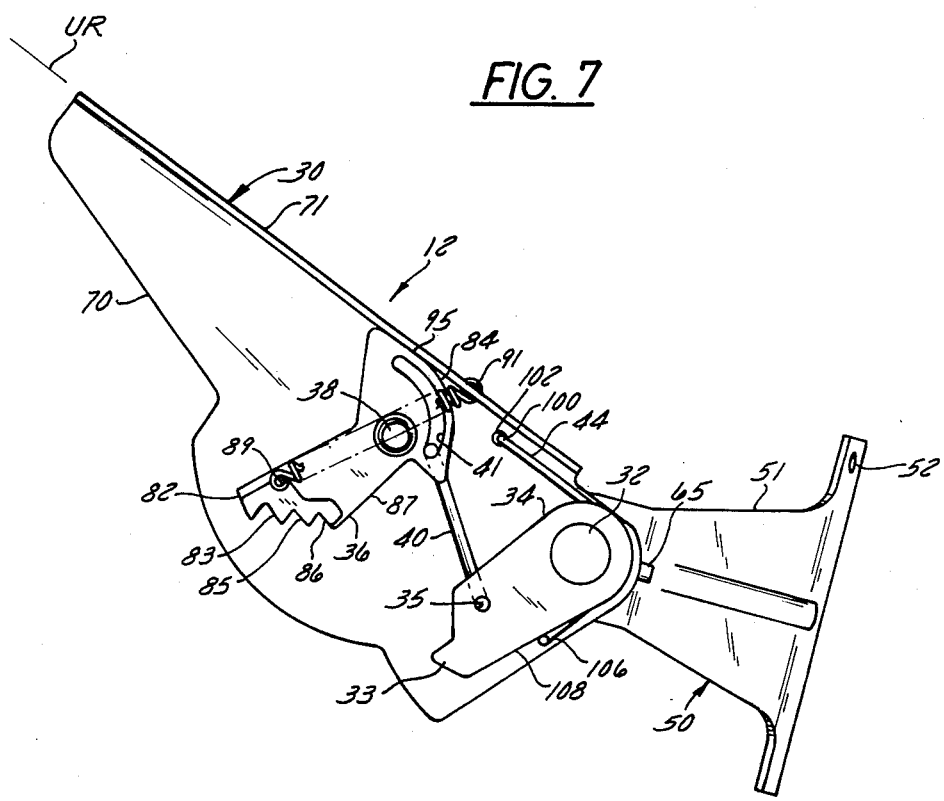
Figure 11:
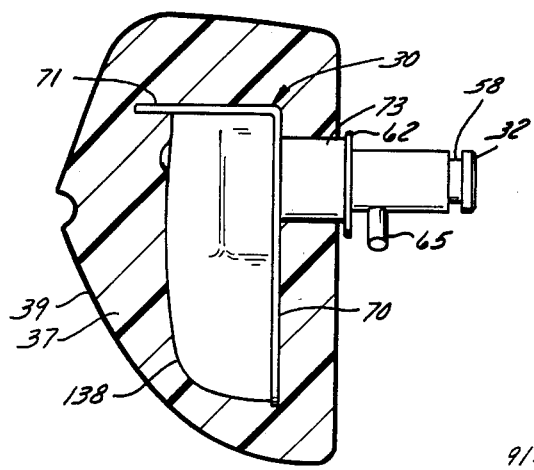
Figure 9:
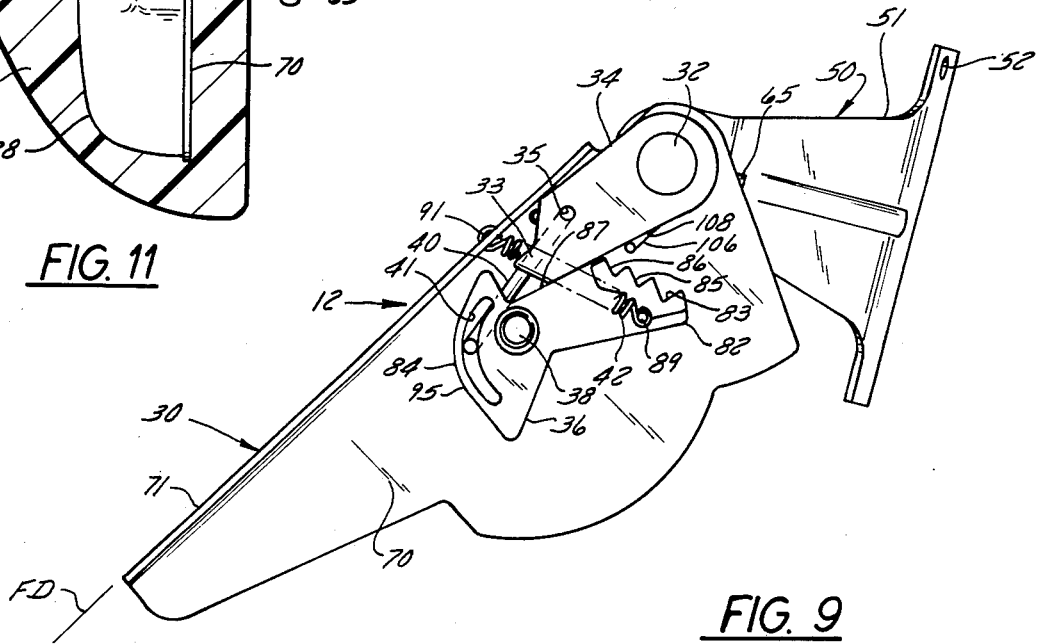
Figure 10:
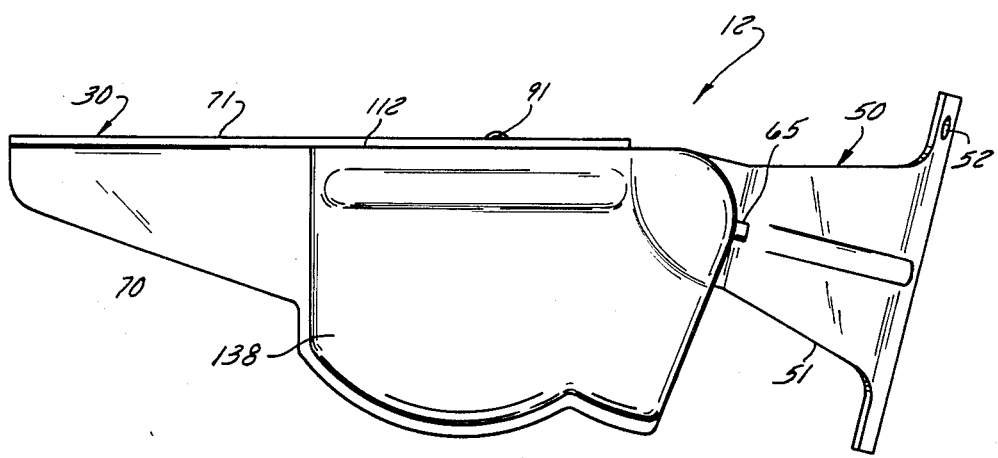

FIGS. 7, 8, and 9 are side elevation views of the operating means of an arm rest assembly showing the relationship of components therein when the arm rest is in the mid-tilt, high-tilt, reset and full-down positions, respectively;

FIG. 10 is an enlarged side elevation view of the arm rest assembly with upholstery removed but with a protective cover for the operating means in place; and FIG. 11 is an enlarged bottom plan view, partly in section, of the upholstered arm rest assembly of FIG. 1.

DESCRIPTION OF PREFERRED EMBODIMENT

Referring to FIG. 1, there is shown a seat assembly 10 having a pair of tiltable arm rest assemblies 12 (only one visible) in accordance with the present invention and mounted on a pedestal 14 which is rigidly secured by bolts 16 to the floor 17 of the operator's compartment 15 of a vehicle 18, such as a backhoe or the like. Seat assembly 10 comprises a rigid sheet metal seat pan 20 which is formed to provide a seat portion 21 and an integral back rest portion 22. A resilient compressible seat cushion 23 and a resilient compressible back rest cushion 24 are attached to the seat portion 21 and back rest portion 22, respectively. Seat assembly 10 is resiliently supported on pedestal 14 and can be adjustably positioned thereon. In particular, seat assembly 10 can be shifted horizontally and locked in various fore and aft positions, can be shifted vertically and locked at various heights, and (as shown schematically in FIG. 6) can be tilted about a horizontal axis A and locked in any of three tilted positions. In FIG. 6, the three tilted positions of seat assembly 10 are designated: normal position, mid-tilt position MT and full-tilt position FT. Seat assembly 10 is shown locked in its no-tilt position NT in FIG. 1 and the seat pan 20 thereof is understood to be in the same no-tilt position NT in FIGS. 3, 4, 7, 8 and 9. But it is to be understood that seat assembly 10 could be tilted to and locked in its two other positions, regardless of the tilted position of the arm rest assemblies 12, as hereinafter explained. The construction of a suitable pedestal 14 and specific means to enable adjustable positioning of seat assembly 10 thereon is disclosed in U.S. patent application Ser. No. 523,783 filed Aug. 17, 1983 by K. E. Hill and assigned to the same Assignee as the present application.

Seat assembly 10 is provided with the pair of arm rest assemblies 12, only one of which is depicted herein, and each is located on a lateral side of the seat assembly 10 generally above seat portion 21. The arm rest assemblies 12 are attached directly to the seat pan 20, as hereinafter explained, by mounting means hereinafter described in detail, but could be attached to supporting structures (not shown) adjacent the seat assembly 10. As will be understood, the two arm rest assemblies 12 (only one visible) are substantially identical to each other in construction and mode of operation, except for being mirror images of each other, and therefore only the left side arm rest assembly 12 shown in FIG. 1 is hereinafter described in detail.

As FIG. 6 shows, arm rest assembly 12 can be tilted about a horizontal axis B (located on back portion 22 of tiltable seat pan 20) to any of five positions shown schematically in FIG. 6. In FIG. 6 the five tilted positions of arm rest assembly 12 are designated: full-down tilt (stored) position FD, mid-tilt position M, normal-tilt position N, high-tilt position H, and uppermost reset position UR. Arm rest assembly 12 is releasably lockable in positions N, M and FD (stored). In the embodiment shown, axis B is located on seat pan 20 which itself is tiltable to three positions about axis A. Therefore, the relative position of arm rest assembly 12 to horizontal when it is in any of its several tilt positions will depend on the tilt position of seat pan 20. As will be understood, arm rest assembly 12 could be employed with a stationary seat assembly and could be mounted adjacent one side thereof directly on the seat assembly (in the same manner shown) or could be mounted on some other independent supporting structure (not shown).

As FIGS. 2, 3, 4, and 5 best show, arm rest assembly 12 generally comprises a rigid arm rest member or pan 30, means for pivotally mounting the arm rest assembly 12 on or near the seat assembly 10, and an operating means or mechanism to releasably latch the arm rest assembly in its various tilt positions. As FIGS. 1 and 10 show, the arm rest pan 30 and the operating mechanism thereon are preferably, for reasons of safety, comfort and esthetics, covered with suitable upholstery, including resilient padding 37, such as foam rubber, and an outer flexible covering 39 such as vinyl sheeting or self-skinning foam. The operating mechanism is covered by a plastic shell or housing 138.

More specifically, arm rest assembly 12 comprises a pivot shaft 32 for rigid attachment to the seat pan 20. The pivot shaft 32 serves as one part of the mounting means by which the arm rest assembly 12 is mounted on the seat assembly 10. The other part of such mounting means is included on the seat assembly 10 and takes the form of a mounting bracket assembly 50. The rigid arm rest or pan 30 is pivotally mounted on the pivot shaft 32 and a pawl 34 is rigidly mounted on the pivot shaft 32. A latch 36 is pivotally mounted on arm rest pan 30 by a latch pivot pin 38 and is releasably engageable with pawl 34. A connecting rod 40 is connected between pawl 34 and a slot 41 in latch 36 and an overcenter tension spring 42 is connected between latch 36 and arm rest pan 30.

The pawl 34, the latch 36, the overcenter spring 42 and the connecting rod 40 serve as an operating means or mechanism to position and releasably lock the arm rest assembly 12 in selected positions.

The preferred embodiment includes an optional torsion spring 44 connected between pawl 34 and arm rest pan 30 to prevent the latter from accidentally "racheting up", as hereinafter explained.

Figure 2:
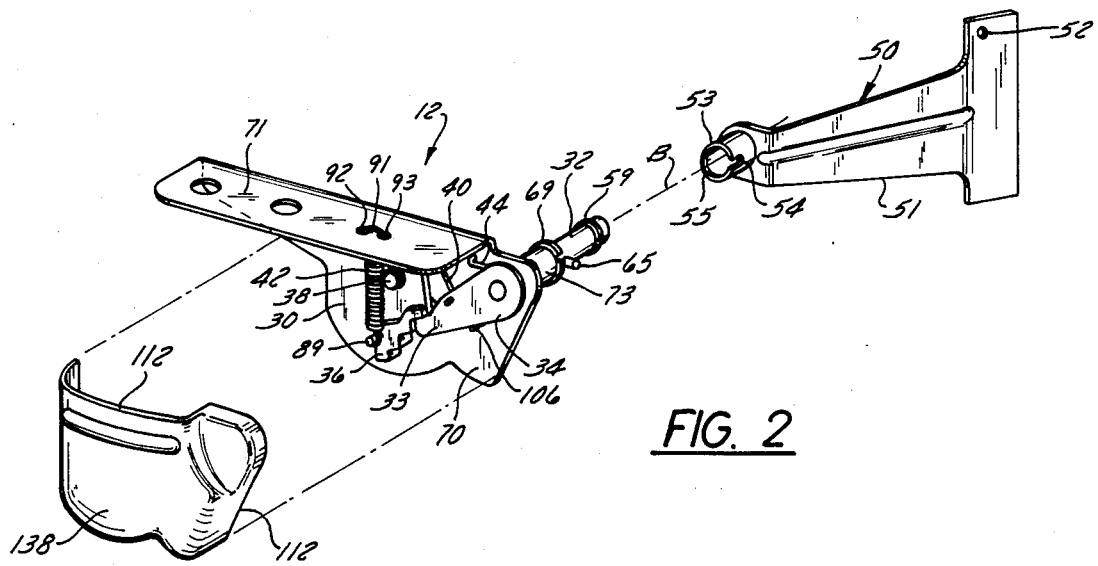
FIG. 2 is an enlarged perspective view, with upholstery removed, of the operating means and mounting means of the arm rest assembly of FIG. 1.

As regards the mounting means, FIGS. 2 and 4 show that pivot shaft 32 is generally cylindrical and has a first annular groove 58 near its outer end for receiving a C-shaped spring ring 59 and a second annular groove 60 intermediate its ends for receiving a snap ring 62. Pivot shaft 32 also includes a hole 64 therethrough transverse to its axis for receiving a pre-installed pin 65. The inner end of pivot shaft 32 is rigidly secured as by welding at 66 to a hole 67 in one end of pawl 34. Pawl 34 takes the form of a rigid plate having a projection 33 for engaging latch 36 and a hole 35 for pivotally receiving one end of connecting rod 40. The pivot shaft 32 serves as one part of the mounting means by which arm rest assembly 12 is mounted on seat assembly 10. Such mounting means further comprises another part in the form of the mounting bracket assembly 50 on seat pan 20. Assembly 50 comprises a rigid bracket 51 which has an opening 52 at one end and a cylindrical tube 53 at its other end. Bracket 51 is welded to seat pan 20 as at 153. The threaded opening 52 and registering hole 154 in seat pan 20 receive bolts 155 by which seat pan 20 is rigidly secured to the suspension. Cylindrical tube 53, which has a slot 54 and a chamfered surface 55 at its outer end, receives the outer end of pivot shaft 32.

As regards the arm rest member or pan 30, it takes the form of a flat plate 70 having rear and front ends and having a flange 71 along one (upper) edge thereof and a hole 72 near its rear end. A tube 73 in hole 72 is rigidly secured as by welding at 69 to plate 70 for receiving pivot shaft 32 which extends therethrough. Pawl 34 and snap ring 62 on pivot shaft 32 cooperate with the ends of tube 73 and maintain arm rest pan 30 pivotally attached to the pivot shaft. The outer end of pivot shaft 32 with spring ring 59 and pin 65 thereon is receivable in the cylindrical tube 53 on seat pan 20. The spring ring 59, initially comnpressed by chamferred surface 55 during shaft insertion, expands to inhibit (but not prevent) axial withdrawal and mount the arm rest assembly 12 on seat pan 20. The pre-installed pin 65 in hole 64 in pivot shaft 32 is received in slot 54 in tube 53 to prevent rotation of pivot shaft 32 and pawl 34 thereon relative to seat pan 20. Thus, arm rest pan 30 is pivotable to its several tilt positions about the axis B which is defined by pivot shaft 32.

Flat plate 70 of arm rest pan 30 has a hole 75 intermediate its ends for receiving the latch pivot pin 38 which is welded in place therein. Latch pivot pin 38 has an annular groove 76 near its inner end receives a friction grip ring 78 which secures the latch 36 on the latch pivot pin 38 against axial displacement but allows for pivotal movement thereof.

As regards the operating means or mechanism, latch 36 takes the form of a flat plate having a hole 80 therethrough for receiving latch pivot pin 38. Latch 36 has opposite end portions on opposite sides of hole 80 which, for convenience in discussion and not by way of limitation, are hereinafter referred to as the lower end portion 82 and the upper end portion 84.

Lower end portion 82 of latch 36 comprises a series of ratchet teeth defining three detents 83, 85 and 86 and also comprises a flat cam surface 87, which detents and cam surface cooperate with projection 33 of pawl 34, as hereinafter described. Lower end portion 82 also comprises an anchor pin 89 to which one end of overcenter spring 42 is attached; the other end of spring 42 being attached to flange 71 of arm rest pan 30 at an anchor point 91 defined by two adjacent holes 92 and 93, in flange 71.

Upper end portion 84 of latch 36 comprises a curved cam surface 95 which is eccentric relative to latch pivot pin 38 and engageable with flange 71 to limit rotation of latch 36 in the clockwise direction (relative to FIG. 8). Upper end portion 84 of latch 36 also comprises a curved slot or groove 41. Cam surface 95 generally follows the contour of curved slot 41 adjacent thereto. Groove 41 slidably receives the other end of connecting rod 40.

The optional torsion spring 44 takes the form of a length of resilient wire having one end 100 anchored in a hole 102 in plate 70. Spring 44 has an intermediate portion 104 wound at least 360° around tube 73 on plate 70, and has its other end 106 bent to firmly engage the rear edge 108 of pawl 34. Spring 44 operates to bias pan 30 in the direction of arrow 110 in FIG. 3 so that pawl 34 is in firm engagement with one of the teeth or detents 83, 85, 86 in latch 36 in the event that the vehicle 18 on which the seat assembly 10 and arm rest assembly 12 are mounted hits a severe bump.

As previously mentioned and as FIGS. 2, 5, 10 and 11 show, the movable components mounted on the arm rest pan 30 are enclosed by a cover 138 which overlies those components and is secured to the arm rest pan 30 by glueing along the cover edge 112 and by the overlying upholstery padding 37 and covering 39 (FIGS. 1 and 10). Cover 138 takes the form of a shell fabricated of plastic or metal. As FIG. 11 makes clear, padding 37 could take the form of "self-skinning" urethane foam on the padding 37 to completely encapsulate the assembled mechanism. One of the functions of the pastic shroud or cover 138 is to seal off the adjustment mechanism from the expanding foam while the arm rest is in the mold. During manufacture, the entire mechanism is assembled, then the plastic shroud is attached to the arm rest pan with an adhesive sealant. The entire assembly is then put into the mold and encapsulated with foam. This is the present preferred method of upholstery, but other more conventional methods could be used (molded filler, cut and sewn vinyl, cloth, etc.)

The tiltable arm rest assembly 12 is employed and operates as follows. Assume that arm rest assembly 12 is completely assembled and is ready to be installed, either in the factory or in the field, on a seat assembly 10 which has a mounting assembly 50 already secured to the seat pan 20. As FIG. 2 makes clear, installation is accomplished by aligning pivot shaft 32 with tube 53 of mounting assembly 50 and forcibly inserting it into the tube. When this is done, spring ring 59 prevents axial withdrawal of pivot shaft 32 unless substantial removal force is exerted, as FIG. 4 shows. Furthermore, pre-installed pin 65 engages slot 54 in tube 53 and rotation of pivot shaft 32 and pawl 34 is prevented. Slot 54 also causes pawl 34 to assume a predetermined angularly downwardly depending fixed position as shown in FIG. 2.

With arm rest assembly 12 so installed, it will initially assume one of the four positions, H, M, N, or FD shown in FIG. 6, depending upon the initial state of engagement of pawl 34 and latch 36. However, for purposes of discussion assume that it is in full-down (stored) position FD shown in FIG. 9. In this position, arm rest assembly 12 effectively acts as a hip support if seat assembly 10 is in the non-tilt position NT shown in FIG. 6. However, if seat assembly 10 is initially set in either mid-tilt position MT or full-tilt position FT, then the arm rest assembly 12 is in a convenient arm supporting position. When arm rest assembly 12 is in full-down (stored) position (see FIG. 9), it can be raised therefrom by manual lifting of the forward end thereof to normal-tile position N which is substantially horizontal (see FIG. 3), then to mid-tilt position M (see FIG. 7) and then to high-tilt position H (see FIG. 7). However, arm rest assembly 12 cannot be moved directly from position H (FIG. 7) to lower position M (FIG. 7), or from position M (FIG. 7) to lower position N (FIG. 3), or from position N (FIG. 3) to lower position FD (FIG. 9). Instead, in order to proceed from a higher position to a lower position, the arm rest must be raised to uppermost reset position UR (see FIG. 8), then lowered to full-down tilt position FD (see FIG. 9) passing through all positions H, M, N without latching, and then raised from position FD (FIG. 9) to whatever position N, M, H, is desired.

The relative interrelationships of the pawl 34 and latch 36 and their associated components for the positions FD, N, M, H and UR of FIG. 6 are shown schematically in FIGS. 9, 3, 7, 7, and 8, respectively.

In the embodiment disclosed herein only three tilt positions N, M, H, besides full-tilt position FD, are depicted. However, it is to be understood that a greater or lesser number of tilt positions are possible, depending on the construction of latch 36 and the number of detents or teeth provided therein.

As FIGS. 3, 7, 8 and 9 show, the bracket 50, the pivot shaft 32 thereon and the pawl 34 on the pivot shaft remain stationary for all tilt positions of the arm rest assembly 12. When an arm rest assembly is in positions N, M or H, the detent 33 of pawl 34 engages one of the detends 86, 85 or 83, respectively in the latch 36. The overcenter spring 42 remains on one (rear) side of the pivot pin 38 and acts to bias the latch 36 against the pawl 34. The connecting rod is free to slide in slot or groove 41 during position changes. The biasing spring 44 adds further biasing force acting to hold the latch 36 and pawl 34 in engagement. As comparison of FIGS. 7 and 8 makes clear, when arm rest pan 30 is swung upward from position H to UR, one end of the connecting rod 40 reaches one end of slot 41 and causes latch 36 to pivot (clockwise with respect to FIGS. 7 and 8) and spring 42 moves overcenter to the other (outer) side of the pivot pin 38. Engagement of cam surface 95 of latch 36 with the underside of flange 71 (see FIG. 8) limits clockwise rotation of latch 36. Manual lifting force on arm rest pan 30 must be sufficient to overcome the bias of biasing spring 44 and this lifting force is normally greater than the force caused by road bouncing of vehicle 18 which would otherwise cause pan 30 to "jump" upward. As arm rest pan 30 moves from position UR (FIG. 8) to position FD (FIG. 9), the one end of connecting rod 41 reaches the other end of slot 41 and forces latch 36 to start to move counter clockwise (relative to FIGS. 8 and 9) and then end projection 33 on pawl 34 causes further counter clockwise rotation, whereupon spring 42 moves overcenter and pawl projection 33 engages surface 87 of latch 36, as FIG. 9 shows. Arm rest pan 30 and the entire arm rest 12 remains locked in full-down tilt position FD (FIG. 9) until arm rest pan 30 is manually raised therefrom (moving clockwise) to position M in FIG. 3. As this occurs, pawl projection 33 moves along surface 87 of latch 36 and forces latch 36 to move clockwise about its pivot pin 38 until pawl projection 33 engages detent 86. Arm rest pan 30 is then sequentially movable to tilt positions N and H if so desired.

I claim:

1. A component assembly mountable on a support and pivotally movable thereon between angularly spaced apart first, second and third positions, said component assembly comprising:
   a member;
   mounting means on said member for mounting said member on said support for pivotal movement between said positions, said mounting means comprising a pivot shaft attachable to said support and said member being pivotally mounted on said pivot shaft;
   and operating means on said member, said operating means comprising:
   a pawl rigidly mounted on said pivot shaft;
   a latch pivotally mounted on said member and engageable with said pawl;
   an overcenter spring connected between said length and said member, said overcenter spring being operable to maintain engagement of said pawl and said latch when said member is moved from first to second position;
   and a connecting rod connected between said pawl and said latch, said connecting rod effecting disengagement of said latch and said pawl and effecting overcenter movement of said overcenter spring when said member is moved from second to third position and said connecting rod effecting opposite overcenter movement of said overcenter spring when said member is moved to first position;
   said operating means being actuatable by pivotal movement of said member in one direction from first to second positions to releasably lock said member in said second position and prevent movement thereof in a direction opposite to said one direction;
   said operating means being further actuatable by pivotal movement of said member in said one direction from second to third position to release said member from said second position and enable pivotal movement thereof in said opposite direction from said third position, through said second position, to said first position.

2. An arm rest assembly mountable on a support and pivotally movable thereon between angularly spaced apart first full-tilt position, second position and third reset position, said arm rest assembly comprising:
   an arm rest;
   mounting means on said arm rest for mounting said arm rest on said support for pivotal movement between said positions, said mounting means comprising a pivot shaft attachable to said support and said arm rest being pivotally mounted on said support;
   and operating means on said arm rest, said operating means comprising:
   a pawl rigidly mounted on said pivot shaft;
   a latch pivotally mounted on said arm rest and engageable with said pawl;
   an overcenter spring connected between said latch and said arm rest;
   and a connecting rod connected between said pawl and said latch;
   said operating means being actuatable by pivotal movement of said arm rest in one upward direction from first to second positions to releasably lock said arm rest in said second position and prevent movement thereof in a downward direction opposite to said one upward direction;
   said operating means being further actuatable by pivotal movement of said arm rest in said one direction from second to third position to release said arm rest from said second position and enable pivotal movement thereof in said opposite direction from said third position, through said second position, to said first position, said overcenter spring operating to maintain engagement of said pawl and said latch when said arm rest is moved from first to second position;

said connecting rod effecting disengagement of said latch and said pawl and effecting overcenter movement of said overcenter spring when said arm rest is moved from second to third position;

and said connecting rod effecting opposite overcenter movement of said overcenter spring when said arm rest is moved to first position.

* * * * *